(12) United States Patent
Rosengren et al.

(10) Patent No.: US 8,819,940 B2
(45) Date of Patent: Sep. 2, 2014

(54) METHOD FOR MANUFACTURING A LINEAR ACTUATOR

(75) Inventors: Gary W. Rosengren, Brooklyn Park, MN (US); Wyatt A. Grunerud, Plymouth, MN (US); Jeff Karls, Big Lake, MN (US)

(73) Assignee: Tolomatic, Inc., Hamel, MN (US)

( * ) Notice: Subject to any disclaimer, the term of this patent is extended or adjusted under 35 U.S.C. 154(b) by 550 days.

(21) Appl. No.: 13/035,599

(22) Filed: Feb. 25, 2011

(65) Prior Publication Data
US 2012/0048041 A1   Mar. 1, 2012

Related U.S. Application Data

(60) Provisional application No. 61/308,726, filed on Feb. 26, 2010.

(51) Int. Cl.
*B21D 53/10* (2006.01)
*F16H 25/20* (2006.01)
*F16H 25/24* (2006.01)

(52) U.S. Cl.
CPC ........ *F16H 25/20* (2013.01); *F16H 2025/2481* (2013.01)
USPC ..... 29/898.12; 29/527.3; 29/527.2; 29/527.1; 29/527.5; 74/89.23

(58) Field of Classification Search
CPC ......... F16H 25/20; F16H 25/24; B22D 19/00; B22D 19/04; B22D 19/045; B29C 43/18; B29C 33/56; B29C 70/84

USPC .......... 29/898.12, 527.1, 527.2, 527.3, 527.5; 74/89.23

See application file for complete search history.

(56) References Cited

U.S. PATENT DOCUMENTS

| | | | | |
|---|---|---|---|---|
| 4,723,767 A * | 2/1988 | McPherson et al. | | 269/32 |
| 4,872,795 A * | 10/1989 | Davis | | 411/433 |
| 5,797,574 A * | 8/1998 | Brooks et al. | | 248/398 |
| 5,911,789 A * | 6/1999 | Keipert et al. | | 74/493 |
| 6,756,707 B2 * | 6/2004 | Hochhalter et al. | | 310/20 |
| 7,151,333 B2 * | 12/2006 | Suzuki et al. | | 310/71 |
| 8,087,728 B2 * | 1/2012 | Corcoran | | 297/344.14 |
| 8,206,316 B2 * | 6/2012 | Hibner et al. | | 600/567 |
| 2007/0012127 A1 * | 1/2007 | Morton | | 74/89.42 |

* cited by examiner

Primary Examiner — Sarang Afzali
(74) Attorney, Agent, or Firm — Dorsey & Whitney LLP

(57) ABSTRACT

A method for manufacturing a linear actuator includes inserting a portion of a thrust member of the actuator into a casting portion of a molding apparatus. The casting portion includes a model screw member having a threaded portion. A molding material can be added into the cast portion to overmold a nut to the thrust member. Thus, the nut will include a threaded portion on an internal circumference mateable with the threaded portion of the model screw member. The overmolded nut and thrust tube member may be coupled to a screw shaft of the actuator, such that the threaded portion of the nut mates with a threaded portion of the screw shaft.

18 Claims, 4 Drawing Sheets

METHOD FOR MANUFACTURING A LINEAR ACTUATOR

CROSS REFERENCE TO RELATED APPLICATION(S)

This application claims priority to U.S. Provisional Patent Application No. 61/308,726, filed on Feb. 26, 2010, the entire contents of all of which are hereby incorporated herein by reference in their entirety.

FIELD OF THE INVENTION

The present disclosure relates generally to an electrically powered linear screw-driven actuator. More particularly, the present disclosure relates to a method of manufacturing an overmolded plastic nut and thrust tube assembly, and a bearing journal assembly for a linear actuator. The present disclosure has particular application to the applications requiring a short stroke, the actuation of injection molding and clamping fixtures and the like, and the linear movement of various apparatuses requiring highly accurate positioning, among others.

BACKGROUND OF THE INVENTION

Several industries have utilized linear actuators to control the movements of automated fixtures. This requires controlled linear movement of the type that is produced by linear actuators, which can be driven by various mechanisms, including electric, pneumatic or hydraulic actuators. Linear actuators work by extending and retracting a thrust member, usually with a work piece affixed to its end to perform certain tasks. Particularly, electric actuators typically include a thrust tube assembly, a screw shaft, a bearing journal assembly, and a work piece connection end. A motor shaft can be coupled to the bearing journal assembly to rotate the journal assembly, and thereby the screw shaft. The screw shaft engages a nut coupled with the thrust tube assembly, which transfers rotary motion of the screw shaft into linear motion of the thrust tube assembly. The work piece connection end can support a variety of tools depending on the use of the particular actuator.

However, the manufacture of these devices can often be complicated and not always cost-effective. This can be especially true with regard to the assembly of the thrust tube and bearing journal assemblies. Often, the nut needs to be mechanically coupled with a thrust tube to form the complete thrust tube assembly. The process requires a significant amount of time and exactness to form a well-working actuator. The difficulty of the process is further intensified when the parts being worked on, such as the nut, are relatively small.

Thus, there exists a need in the art for an improved method of manufacturing a screw-driven linear actuator. This includes a need for a simpler method of manufacturing, using less connective parts and a less intensive process. There is also a need in the art for a more cost effective technique for assembling an actuator.

BRIEF SUMMARY OF THE INVENTION

The present disclosure relates to an improved method for manufacturing a linear actuator. In some embodiments, the manufactured device can be used to replace pneumatic cylinders, and allows for control of linear position and acceleration of a thrust member. The present disclosure particularly relates to the manufacture of linear actuators used in conjunction with injection molding devices and the like, and other fixtures and devices requiring relatively short actuation strokes and highly accurate positioning.

The present disclosure, in one embodiment, relates to a method for manufacturing a linear actuator. The method includes inserting a portion of a thrust member of the actuator into a casting portion of a molding apparatus. The casting portion includes a model screw member having a threaded portion. A molding material can be added into the cast portion to overmold a nut to the thrust member. Thus, the nut will include a threaded portion on an internal circumference mateable with the threaded portion of the model screw member. The overmolded nut and thrust tube member may be coupled to a screw shaft of the actuator, such that the threaded portion of the nut mates with a threaded portion of the screw shaft.

The present disclosure, in one embodiment, relates to another method for manufacturing a linear actuator. The method includes providing a screw shaft having a first end and a bearing journal having an end adapted to receive the first end of the screw shaft. The bearing journal may be coupled to the screw shaft by crimping the end of the bearing journal adapted to receive the first end of the screw shaft to the first end of the screw shaft. In an alternative embodiment, the bearing journal may be coupled to the screw shaft by rotary swaging the end of the bearing journal adapted to receive the first end of the screw shaft to the first end of the screw shaft The present disclosure, in another embodiment, relates to a linear actuator having a housing, an elongated screw shaft, and a thrust tube assembly. The screw shaft includes external threads, and is axially fixed but rotatable relative to the housing. The thrust tube assembly includes a thrust tube and a nut overmolded to the thrust tube and comprising a threaded portion on an internal surface mateable with the external threads of the screw shaft.

While multiple embodiments are disclosed, still other embodiments of the present disclosure will become apparent to those skilled in the art from the following detailed description, which shows and describes illustrative embodiments of the disclosure. As will be realized, the various embodiments of the present disclosure are capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

While the specification concludes with claims particularly pointing out and distinctly claiming the subject matter that is regarded as forming the various embodiments of the present disclosure, it is believed that the embodiments will be better understood from the following description taken in conjunction with the accompanying Figures, in which:

DETAILED DESCRIPTION

The present disclosure relates to a screw-driven linear actuator, and an improved method of manufacture. Particularly, the present disclosure relates to novel and advantageous methods for overmolding a plastic nut and thrust tube assembly. Additionally, the present disclosure relates to novel and advantageous methods for attaching the screw shaft to the bearing journal assembly. These methods can simplify the construction, save time, and reduce the costs during manufacture of the actuator.

Figure 1:
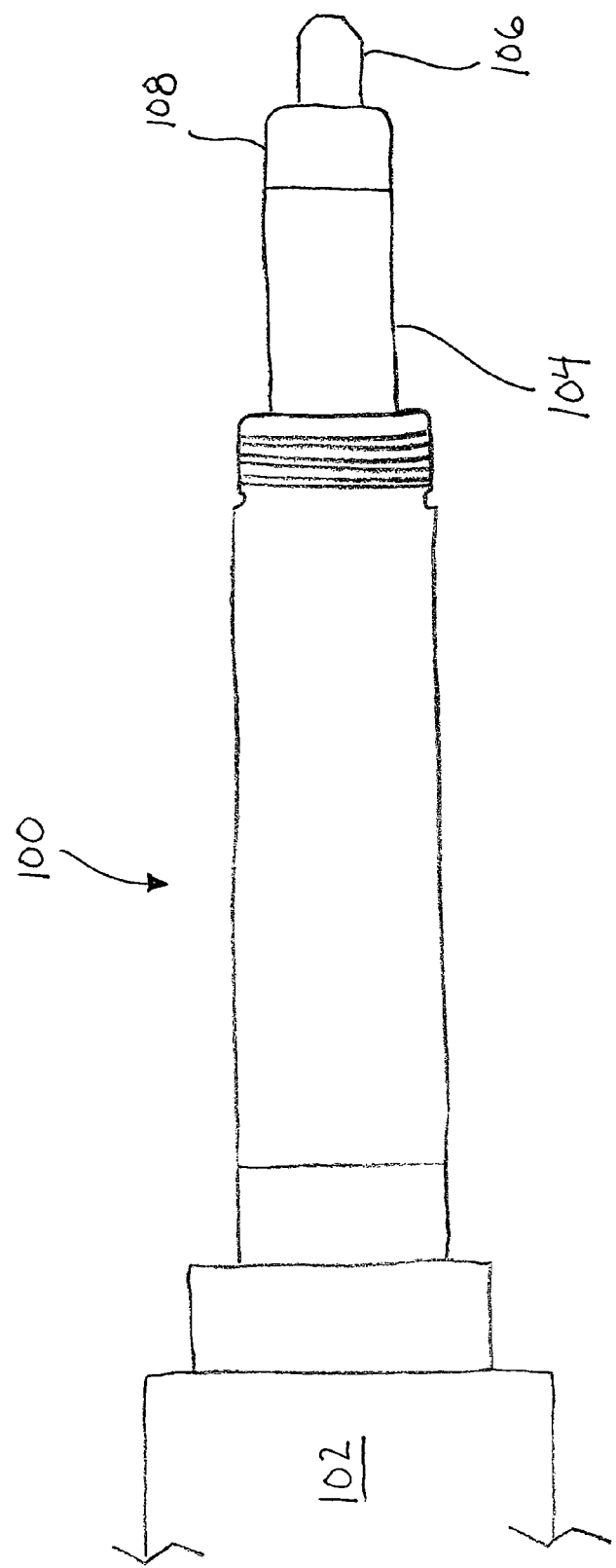
FIG. 1 is side view of a system including a screw-driven linear actuator according to one embodiment of the present disclosure.

FIG. 1 illustrates a system including a screw-driven linear actuator 100 according to the present disclosure. As can be seen in FIG. 1, a motor 102 may be attached to the linear actuator 100 providing the driving power to the screw shaft inside the actuator. The actuator 100 transfers the rotary motion of the motor to linear motion through interaction of the screw shaft and a thrust tube assembly 104. A workpiece or tool 106 may be attached to a workpiece connection end 108 of the thrust tube assembly. Thus, linear motion of the thrust tube assembly causes linear motion of the workpiece 106.

Figure 2:
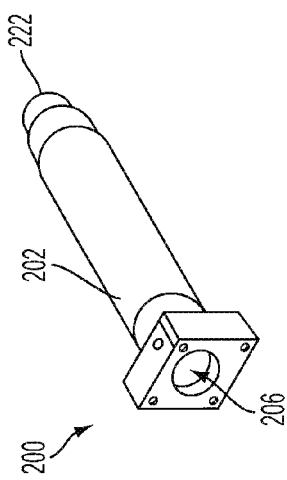
FIG. 2 is an isometric view of the actuator of FIG. 1.
Figure 3:
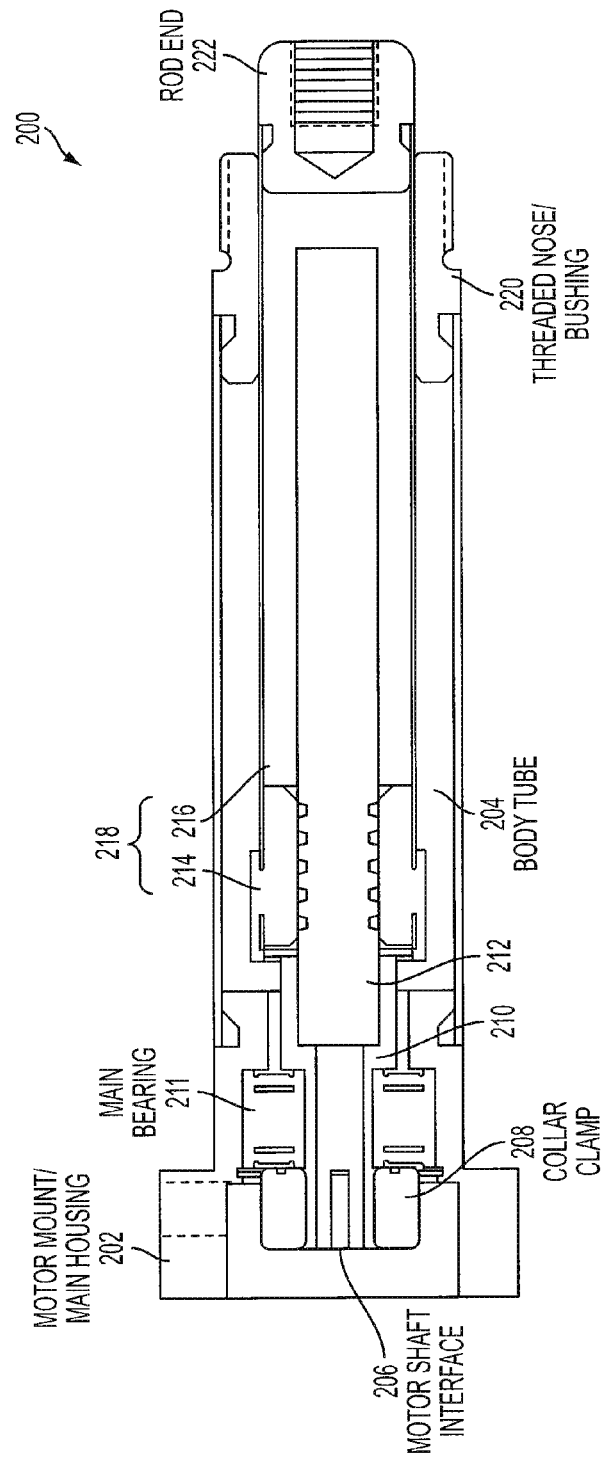
FIG. 3 is a cross-sectional diagram of a screw-driven linear actuator according to one embodiment of the present disclosure.

FIGS. 2 and 3 show a isometric view and cross-sectional view, respectively, of an actuator 200 according to one embodiment of the present disclosure. With respect to actuator 200, references to the "distal" end of actuator 200 shall refer to the direction towards the work piece rod end of the actuator 200. References to the "proximal" end will mean the opposite direction, towards the motor mount end of the actuator.

Actuator 200 can include a motor mount or main housing 202. The main housing 202 may surround or enclose a body tube area 204, providing the space within the housing for the internal working components. Main housing 202 may be proximally connected via screws or another similar attachment mechanism to a drive motor, such as motor 102 shown in FIG. 1. The main housing 202 may include a motor shaft interface 206, for coupling the motor to the internal working components of the actuator. More specifically, in one embodiment, the motor shaft interface 206 may use a collar clamp 208, or other similar attachment device, to couple the motor to a bearing journal assembly 210. A main bearing 211 may surround and support the bearing journal assembly 210, thus allowing the bearing journal assembly to rotate relative the main housing 202. The distal end of the bearing journal assembly 210 may be coupled to, or coupled near to, the proximal end of a screw shaft 212. In one embodiment, the bearing journal assembly 210 may be coupled with the screw shaft 212 using crimping, rotory swaging, or through another similar connective technique as will be described in further detail below. Screw shaft 212 is axially fixed, but rotatable relative the main housing 202. Screw shaft 212 has at least a portion that is externally threaded and which may be engageable with a nut, such as overmolded plastic nut 214. A hollowed thrust tube 216 is positioned circumferentially around a central axis of the screw shaft 212, and generally surrounds at least a portion of the screw shaft. The thrust tube 216 may be coupled to nut 214. Together, the overmolded plastic nut 214 and the hollowed thrust tube 216 form the thrust tube assembly 218. The thrust tube assembly 218 may or may not be rotatably fixed, but is axially moveable relative the main housing 202. A threaded nose or bushing 220 may be attached at the distal end of the main housing 202 for guiding and supporting movement of the thrust tube assembly 218. A workpiece connection end or rod end 222 can be coupled to the distal end of the thrust tube assembly 218. The workpiece connection end 222 can be adapted to hold a variety of attachments, workpieces, or tools, depending on the particular use of the linear actuator 200.

In operation, the motor 102 can be used to drive, the bearing journal assembly 210, through motor shaft interface 206. The rotational force of the motor is transmitted from the motor shaft interface 206 through the bearing journal assembly 210, which causes rotation of the screw shaft 212 attached thereto. The threads of the screw shaft 212 engage nut 214, causing the nut and thus the thrust tube 216 to move axially relative the main housing 202. The direction of axial movement of the thrust tube assembly 218 depends on the clockwise or counterclockwise force applied to the screw shaft 212. Accordingly, the movement of the workpiece connection end 222, and thus the attached workpiece or tool, is controlled by the driving force of the motor 102.

In one embodiment, manufacture of the thrust tube assembly may involve tapping the nut so that the internal threads of the nut are mateable with the screw shaft for the actuator. In order to get the internal threads on the nut to properly engage the external threads of the screw shaft, the threads of the nut may need to be manufactured with the use of a CNC machine, or other similar tool. Then, the nut may need to be mechanically coupled with the thrust tube to form the complete thrust tube assembly. The difficulty of the process is further intensified when the parts being worked on, such as the nut, are relatively small.

Figure 4:
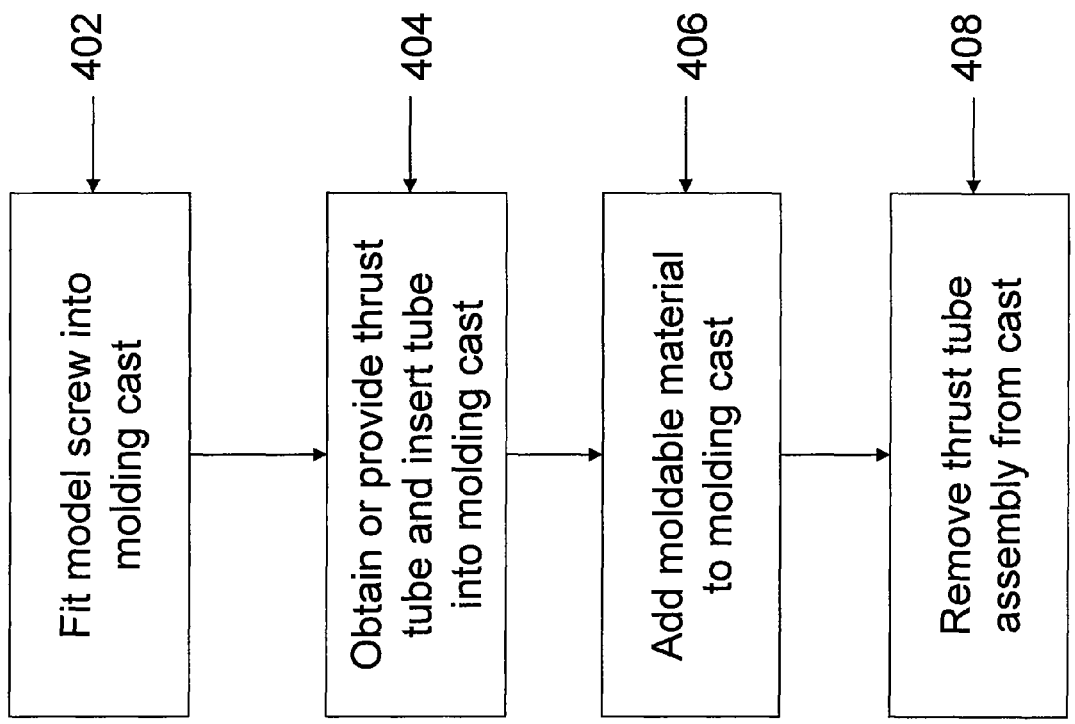
FIG. 4 is a flow diagram of a method of manufacturing a thrust tube assembly according to one embodiment of the present disclosure.

In another embodiment of the present disclosure, the nut 214 may be directly molded to thrust tube 216 using a molding apparatus, such as but not limited to an injection molding machine. The injection molding machine may include a casting portion that is fitted with a model screw member having threads that generally match the threads of the screw shaft 212. With reference to FIG. 4, step 402, in one embodiment of the present disclosure, the thrust tube assembly 218 is manufactured by first fitting the cast portion of the molding machine with the desired model screw member. The molding machine can accommodate various sizes and lengths of model screw members, and can permit varying thread widths, depending on the velocity or force desired for the actuator being constructed. As will be understood, generally, threads that are closer together will yield a slower linear velocity but higher force than threads that are spaced further apart. In step 404, a thrust tube 216 may be obtained or provided. In one embodiment, the thrust tube may be cut to a desired length from a larger parent hollow tube. The thrust tube 216 may be inserted into the casting portion of the injection molding machine, or other suitable molding device, such that a portion of the thrust tube surrounds the model screw member. As shown in step 406, plastic or another moldable material may be added, such as by injection, into the casting portion of the molding device. The plastic or other moldable material hardens to form a nut bonded to the thrust tube, the nut having threads that are mateable with the model screw member, and thereby the screw shaft 212. In step 408, the molded nut 214 and thrust tube 216, forming the thrust tube assembly 218, may be removed from the casting portion. The thrust tube assembly is thereafter ready to receive the screw shaft of the actuator 200.

Similarly, manufacture of the bearing journal assembly may involve using a separate machining operation to construct a bearing journal directly upon the screw shaft. Once this is completed, the screw shaft may then be coupled with the motor shaft with the aid of separate attachment parts, or by the use of threads. Accordingly, this process may involve several steps, and or several component parts so that they can be appropriately mated. This process may be relatively expensive and complicated, requiring more time, parts, and materials to make, as well as to fully assemble the actuator. The difficulty of the process is further intensified when the parts being worked on, such as the bearing journal assembly, are relatively small.

Figure 5:
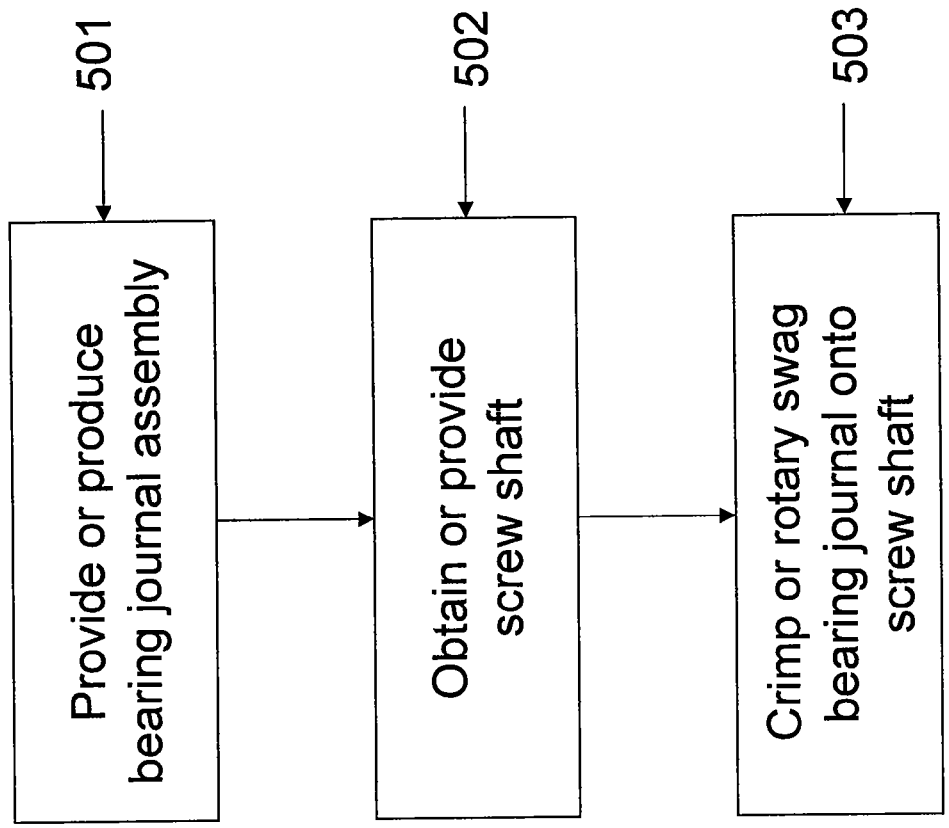
FIG. 5 is a flow diagram of a method of manufacturing a bearing journal assembly according to one embodiment of the present disclosure.

Accordingly, in one embodiment of the present disclosure, assembly of the actuator involves a novel and advantageous method of coupling a bearing journal assembly with the screw shaft. Particularly, as shown in one method according to the present disclosure shown in FIG. 5, a bearing journal assembly 210 may be provided or produced in step 502. The bearing journal assembly 210 may be rather generic, being adapted to interface with the motor 102 at one end and receive the screw shaft 212 at its opposite end. In this embodiment, there is no need for special machining of the bearing journal assembly. Accordingly, the bearing journal assembly may be easily adapted for mass production to save time and costs of its manufacture. In step 504, a screw shaft 212 may be obtained or provided. In one embodiment, the screw shaft 212 may be cut to a desired length from a larger threaded rod. In step 506, the bearing journal assembly 210 may be coupled to and end of the screw shaft 212. In one embodiment of the present disclosure, this may be performed by crimping the bearing journal assembly 210 onto the end of the screw shaft 212. Crimping the bearing journal assembly 210 may involve joining the bearing journal assembly to the screw shaft 212 by deforming the journal assembly around the end of the screw shaft. In another embodiment, the bearing journal assembly 210 may be coupled to the screw shaft 212 by rotary swaging. An alternative to crimping, rotary swaging of the journal assembly 210 can be performed by swaging the journal assembly to the end of the screw shaft 212. Once attached at the motor shaft interface 104, force may be applied from the motor 102 to the bearing journal assembly 210, which causes rotation of the screw shaft 212.

The processes described above provide various advantages over traditional methods of manufacturing a screw-driven linear actuator. In one embodiment, the processes save time and costs of manufacturing the actuator. For example, by overmolding the nut onto the thrust tube using a model screw member, manufacture of the nut can be sped up and its costs reduced while ensuring that the threads of the nut will easily mate with the threads of the screw shaft. Furthermore, the process can be finished with low or minimal effort, as it uses the process of molding, rather than requiring separate machining of both the screw shaft and the nut, followed by mechanical attachment to the thrust tube. In further embodiments, the overmolding technique described herein can help reduce nut size, as well as overall actuator size, as it does not require complicated machining of small parts in order to manufacture the thrust tube assembly. Manufacture of the thrust tube assembly is further simplified because the nut can be simply bonded to the thrust tube during molding.

Similarly, a generic bearing journal assembly can be easily crimped or rotary swaged onto the screw shaft. The bearing journal assembly can then be coupled to the motor. The various embodiments of the present disclosure are thus more cost effective and flexible to manufacture.

Although the various embodiments of the present disclosure have been described with reference to preferred embodiments, persons skilled in the art will recognize that changes may be made in form and detail without departing from the spirit and scope of the present disclosure.

We claim:

1. A method for manufacturing a linear actuator having a screw shaft with an externally threaded portion, the method comprising:
    providing a thrust tube member for the linear actuator;
    inserting a portion of the thrust tube member into a casting portion of a molding apparatus, the casting portion being fitted with a model screw member having a threaded portion that matches the externally threaded portion of the screw shaft, wherein the portion of the thrust tube inserted into the casting portion surrounds the threaded portion of the model screw member;
    adding a molding material into the casting portion to overmold a nut onto the thrust tube member, the nut comprising a threaded portion on an internal circumference mateable with the threaded portion of the model screw member;
    removing the thrust tube member from the casting portion of the molding apparatus into which the model screw member is fitted, wherein the thrust tube member is ready to receive the screw shaft of the linear actuator; and
    coupling the overmolded nut and thrust tube member to a screw shaft of the actuator, wherein the threaded portion on the internal circumference of the nut mates with an externally threaded portion of the screw shaft and an outer portion of the nut is overmolded onto an external circumference of the thrust tube member.

2. The method of claim 1, wherein the thrust member comprises a hollow tube.

3. The method of claim 1, wherein the molding material comprises plastic.

4. The method of claim 1, wherein the casting portion accommodates a variety of screw member sizes.

5. The method of claim 1, wherein the casting portion accommodates a variety of screw member thread widths.

6. The method of claim 1, further comprising machining a bearing journal onto an end of the screw shaft, the bearing journal adapted to interface with a motor for rotating the screw shaft.

7. The method of claim 1, further comprising coupling a bearing journal assembly onto an end of the screw shaft, the bearing journal adapted to interface with a motor for rotating the screw shaft.

8. A method for manufacturing a linear actuator, the method comprising:
    providing a screw shaft having an externally threaded portion and a first end;
    fitting a model screw into a molding apparatus, the model screw having a threaded portion that matches the externally threaded portion of the screw shaft;
    inserting a thrust tube into the molding apparatus, wherein a portion of the thrust tube surrounds the threaded portion of the model screw member;
    overmolding a nut onto the thrust tube, the nut having an internally threaded portion on an internal circumference mateable with the threaded portion of the model screw member;
    removing the thrust tube from the molding apparatus into which the model screw member is fitted;
    mating the internally threaded portion of the plastic nut onto the externally threaded portion of the screw shaft, wherein an outer portion of the plastic nut is overmolded onto an external circumference of the thrust tube;
    providing a bearing journal adapted to interface with a motor and having an end adapted to receive the first end of the screw shaft; and
    coupling the bearing journal to the screw shaft by rotary swaging the end of the bearing journal onto the first end of the screw shaft.

9. A method of making a linear actuator, the method comprising:
    providing a housing;
    providing an elongated screw shaft having external threads, the elongated screw shaft being axially fixed and rotatable relative to the housing; and coupling a thrust tube assembly to the elongated screw shaft, the thrust tube assembly comprising a thrust tube and a nut overmolded onto the thrust tube, the nut having an internally threaded portion on an internal circumference mateable with the external threads of the elongated screw shaft and an outer portion molded onto an external circumference of the thrust tube;

wherein the thrust tube assembly is manufactured by:

inserting the thrust tube into a casting portion of a molding apparatus, the casting portion being fitted with a model screw member having a threaded portion matching the external threads of the screw shaft, wherein a portion of the thrust tube surrounds the threaded portion of the model screw member;

adding a moldable material to said casting portion, thereby forming the nut and bonding the nut to said thrust tube; and removing the thrust tube from the casting portion of the molding apparatus into which the model screw member is fitted, wherein the thrust tube assembly is ready to receive the elongated screw shaft.

10. The method of claim 9, wherein the moldable material is plastic.

11. The method of claim 10, wherein the casting portion accommodates a variety of screw member sizes.

12. The method of claim 10, wherein the casting portion accommodates a variety of screw member thread widths.

13. A method of manufacturing a linear actuator, the method comprising:

providing a thrust tube member for the linear actuator;

providing a screw shaft for the linear actuator, the screw shaft having an externally threaded portion;

fitting a model screw member into a casting portion of a molding apparatus, the model screw member having a threaded portion that generally matches the externally threaded portion of the screw shaft;

inserting a portion of the thrust tube member into the casting portion of the molding apparatus, wherein the portion of the thrust tube member inserted into the casting portion surrounds the threaded portion of the model screw member;

adding a molding material into the casting portion to overmold a nut onto the thrust tube member, the nut comprising an internally threaded portion on an internal circumference mateable with the threaded portion of the model screw member;

removing the thrust tube member from the casting portion of the molding apparatus into which the model screw member is fitted, wherein the thrust tube member is ready to receive the screw shaft for the linear actuator; and coupling the overmolded nut and thrust tube member onto the screw shaft, wherein the internally threaded portion of the nut mates with the externally threaded portion of the screw shaft and an outer portion of the nut is overmolded onto an external circumference of the thrust tube member.

14. The method of claim 13, wherein the casting portion accommodates a variety of model screw members having varying thread widths selected for varying a linear velocity of the thrust tube assembly.

15. The method of claim 13, further comprising providing a motor for driving the linear actuator.

16. The method of claim 15, further comprising providing a housing for the motor and linear actuator, wherein the screw shaft is axially fixed with respect to the housing and rotatable by the motor relative to the housing.

17. The method of claim 16, further comprising providing a bearing journal for the linear actuator, the bearing journal interfacing with the motor at a first end and with the screw shaft at a second end.

18. The method of claim 17, wherein providing the bearing journal comprises machining the bearing journal directly onto an end of the screw shaft.

\* \* \* \* \*